June 29, 1965     C. N. COOPER     3,192,080
HEAT TREATMENT OF WELDS
Filed April 30, 1963     2 Sheets-Sheet 1

INVENTOR
CHRISTOPHER NORMAN COOPER by Wolfe, Hubbard, Voit & Osann
ATTYS.

June 29, 1965     C. N. COOPER     3,192,080
HEAT TREATMENT OF WELDS
Filed April 30, 1963     2 Sheets-Sheet 2

INVENTOR
CHRISTOPHER NORMAN COOPER by: Wolfe, Hubbard, Voit & Osann
ATTYS.

United States Patent Office 3,192,080
Patented June 29, 1965

3,192,080
HEAT TREATMENT OF WELDS
Christopher N. Cooper, Nechells, Birmingham, England, assignor to Kemwell A.G., Zug, Switzerland, a Swiss company
Filed Apr. 30, 1963, Ser. No. 276,914
Claims priority, application Great Britain, May 3, 1962, 17,061
10 Claims. (Cl. 148—127)

This invention relates to the heat treatment of welds, particularly welds joining lengths of steel pipe.

It is well known that, when a welding operation has been performed, the weld and heat-affected zone (i.e. the weld area) may tend to cool in a stressed condition, sometimes with unwanted phases present or with other undesirable properties which might cause a subsequent failure of the weld. In order to minimise such undesirable characteristics, a post-weld heat treatment of the weld area may be effected.

The success of such heat treating operations depends very largely on the ability to heat the weld area to a definite temperature and then to maintain the temperature within specified limits for a specified period of time and/or to control its cooling rate thereafter. Specifications have been laid down in respect of such treatments, having regard to the nature of the metal being treated and to the type of heat treatment required. Thus, for example, according to standard codes which are prescribed for the heat treatment of steel pressure piping, one specification requires that, for stress-relief of 3.5% nickel alloy steels, the weld area should be heated to a temperature of 594° C. to 648° C. and maintained within that range for a period of one-half hour for every inch wall thickness of the pipe (a minimum of one hour is however stipulated). A further specification requires that, for pipes of a low alloy steel containing 4%–6% chromium (e.g. a 5% chromium, 0.5% molybdenum steel), the weld area should be heated to a temperature of 800° C. to 850° C. and then that, between the critical cooling range of 750° C. to 600° C., the overall cooling rate should not exceed 2.8° C. per minute.

Recently it has been proposed to carry out the heat treatment by applying to the pipe, in the region of the weld, a body of a composition containing ingredients which react together exothermically when ignited and which leave behind, after burning, a solid residue of high heat content and of good heat-insulating properties. The procedure is to ignite the composition, which then heats up the weld area, and to allow the composition to cool down in situ.

The exothermic composition employed usually contains aluminium and an oxidising agent for the aluminium, e.g. a mixture of aluminium powder and oxidising agents such as nitrates, chlorates, iron oxide or manganese oxide. It is sometimes advantageous that the amount of oxidising agents is stoichiometrically less than sufficient completely to oxidise all the aluminium present and there is also preferably included in the composition a proportion of a fluoride, e.g. 0.1% to 10% or even more, e.g. up to 20%.

A typical composition for use may be composed as follows:

| | Percent by weight |
|---|---|
| Aluminium in finely divided form (powder, sawings, turnings, or the like) | 8–80 |
| Sodium or potassium nitrate or chlorate | 0–10 |
| Manganese dioxide or iron oxide or both | 5–20 |
| Fluoride (e.g. cryolite) | 0.5–20 |
| Binder (e.g. bentonite, core gum, resins or sulphite lye) | 0–10 |
| Filler (e.g. granulated grog, sand, alumina or furnace aggregate) | Remainder |

Exothermic materials containing silica or siliceous materials tend to form silicate slags during burning, these slags serving to prevent the free access of air to the aluminium when the first stage of the reaction, due to included oxidising agents, is over, with consequent lowering in the efficiency of the heat output of the exothermic material. Accordingly, it is preferred that, in exothermic compositions having amounts of oxidising agents well below that required to react with all the aluminium, the quantity of silica or siliceous materials in the exothermic mass is kept to a minimum and that means are provided to facilitate access of air to the mass. Thus, it has been found that if such exothermic materials contain not more than 5% silica and siliceous materials, the usual siliceous materials used for fillers being replaced by such non-slagging fillers as alumina, and provided that access of air is provided, the full heat potential of the exothermic material is obtained with consequent economic advantage and an increase in temperature.

Using this simple procedure, however, it is extremely difficult to ensure that the temperature in the weld area is maintained for the prescribed period or to achieve the desired rate of cooling within the specifications laid down. Various methods for obtaining the required results have been tried, e.g. the method of surrounding the whole body of the exothermic reacting composition with a layer or layers of heat-insulating refractory material. However, even when using very large amounts of heat-insulating materials (which is uneconomic), difficulties in achieving these results still exist. This is principally due to the fact that the weld area rapidly loses heat by conduction along the metal of the pipe itself.

It is an object of the present invention to make use of conducted heat to trigger secondary heat sources, spaced away from the weld, which slow down the rate of cooling.

According to the present invention a method of heat treating a weld joining two lengths of pipe, comprises locating, as a first sleeve round the weld area of the pipes, a body of an exothermic composition, locating at the ends of the said sleeve, sleeves of heat-insulating material which surround the pipe, locating at the outer ends of said heat-insulating sleeves secondary sleeves of an exothermic composition, igniting the first said sleeve, and, by conduction of heat from the burning first sleeve igniting the secondary sleeves, and allowing the whole assembly of sleeves to remain in situ until cooled down.

The expression "exothermic composition" used herein means a composition which contains ingredients which react exothermically when the composition is ignited.

The first sleeve, thus fired, heats the weld area to the desired maximum temperature. Heat, which is conducted through the heat-insulating material, heats the secondary sleeves of exothermic composition, which are automatically ignited when they reach their ignition temperature, i.e. after an interval of time which can be predetermined by the thickness (in the direction of the pipes) of the insulating sleeves. For a given rise and fall of temperature at the weld the interval of time before ignition of the secondary sleeves is dependent upon several factors one of which is the distance of these sleeves from the weld as determined by the thickness of the spacing sleeves of heat insulating material (the greater the distance, the longer the time interval). The two additional heat sources, thus provided by the secondary sleeves when ignited, raise the temperature of the areas of pipe with which they are in contact, thereby reducing the temperature gradient along the length of pipe between the areas and the weld. As heat flow by conduction is directly proportional to the temperature gradient, the rate of heat loss from the weld is reduced, resulting in the maintenance of the temperature in the weld area and/or a slower rate of cooling. It is desirable to provide heat-insulating sleeves (or other similar barrier) between the first and secondary exothermic sleeves since, otherwise, the secondary sleeves would be ignited directly by the burning first sleeve.

In a particular form of the present invention additional spacing sleeves of heat-insulating material may be provided outside the secondary sleeves and additional sleeves of exothermic composition outside the said additional spacing sleeves, and this construction may thus comprise several such sleeves of exothermic material all spaced apart by means of spacing sleeves of heat-insulating material. By selection of the quantities of exothermic composition, the calorific value of the compositions, the nature of the heat-insulating materials and the thickness of the spacing sleeves, it is readily possible to achieve the desired temperature "hold" and/or rate of cooling at the weld area as may be required.

It will be understood, therefore, that in accordance with this invention the composition and quantity of the exothermic sleeves and heat-insulating sleeve should be such as to achieve the desired end, i.e. that the quantity and composition of the heat-insulating material should be such as to prevent direct firing of the secondary sleeves by heat from the first sleeve and that the quantity, composition and location of the secondary sleeves should be such that, the firing of the first sleeve having brought the weld area to the optimum maximum temperature, the burning of the secondary sleeves, ignited by conducted heat, should provide enough heat to maintain the temperature at the weld area an/or to slow the cooling of the weld area to less than a given maximum through the critical range. As this rate will vary with the nature of the material of the pipes and the dimensions of the pipes, it is not possible to be more specific but it will be appreciated that the optimum conditions are very readily ascertained by trial. It is necessary only to ensure that the thickness of the heat-insulating sleeve is such that the secondary exothermic sleeves fire at a point shortly before the desired maximum temperature of the weld area is reached, or at that point or at a later point. The heat-insulating material for the sleeves is preferably bonded sand though other refractory heat-insulating materials known per se may be used.

It has been found to be of especial value to arrange that the secondary exothermic sleeves (or subsequent such sleeves where more than two secondary sleeves are employed) fire at different points in time. This is readily achieved by arranging that the ignition temperature for such secondary sleeves is reached at different time intervals after the firing of the first exothermic sleeve, a result which can be obtained by using exothermic compositions of different ignition point, by using different thicknesses of spacer sleeve of heat-insulating composition, by using different heat-insulating materials for the spacing sleeves, or by any combination of these expedients. By this technique the secondary sleeves fire one after the other and if there are several such sleeves it can be arranged that the firing of the sleeves takes place alternately first on one side of the weld area and then on the other. This causes periodic reversals of the heat flow across the weld area and an extension of the period of maximum temperature, with reduced temperature variation at the weld area, may be achieved.

Thus by way of example, if a pipe to be treated has a main exothermic sleeve and a number of heat-insulating spacers each $x$ inches thick, the secondary sleeves will fire in pairs at intervals ($y$ minutes) after ignition of the main sleeve. However, if the innermost spacing sleeve on one side of the weld area is reduced to a thickness $x/2$, the secondary exothermic sleeve on that side will fire at $y/2$ minutes interval while the secondary exothermic sleeve on the other side will still fire after a $y$ minutes interval. If there are further spacers and a further pair of exothermic sleeves the further pair will fire at $y/2+y$ minutes and at $2y$ minutes respectively. Thus firing will occur alternately on each side of the weld area at intervals of $y/2$ minutes.

It is found most convenient in practice to provide that all the spacer sleeves have the same thickness except one innermost spacer sleeve which is given half the thickness; by this means it is arranged that the alternate firing of the secondary and subsequent exothermic sleeves occurs at regular intervals. However, as already noted, by employing spacer sleeves of suitable thickness it is possible accurately to control the firing of the exothermic sleeves on a regular or non-uniform basis.

It is, of course, desirable in order to avoid heat losses, and thus to make more economical use of the exothermic materials, to surround the assembly of sleeves just mentioned with an outer covering of heat-insulating material. The heat-insulating covering may consist, for example, of preformed asbestos-based shapes or it may be applied as described in our application No. 8127/63.

The invention will now be further described with reference to the accompanying drawings in which.

Figure 1:
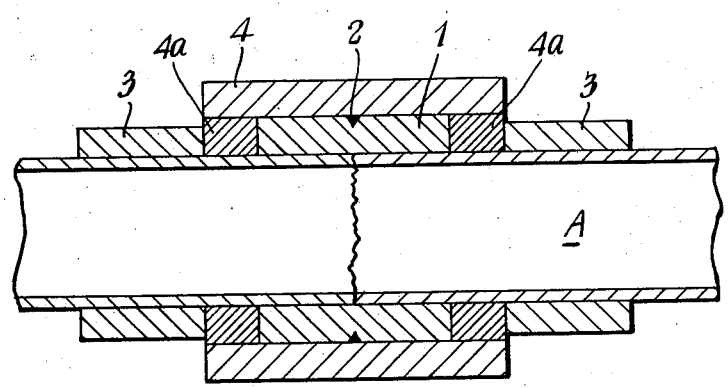
FIGURE 1 illustrates an assembly of the type commonly employed for heat treating the weld area of a steel pipe.

Referring to FIGURE 1, a welded pipe A is provided with a sleeve 1 of exothermic material, a primer composition 2 is moulded into the sleeve 1 for initial ignition and the whole is surrounded by sleeves 3, 4 and 4a of insulating material.

Figure 2:
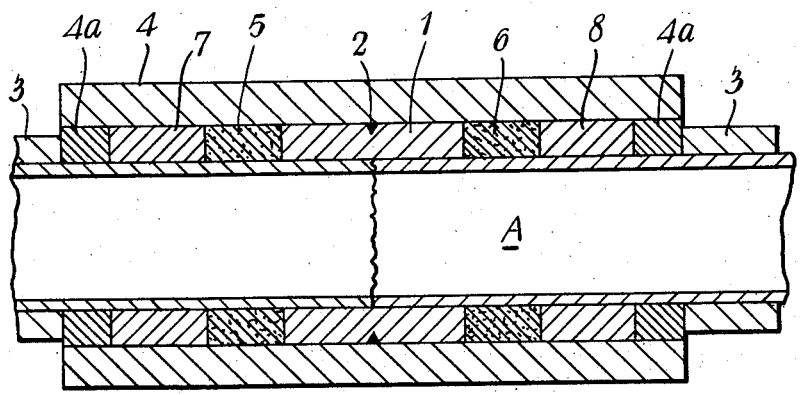
FIGURES 2 and 3 illustrate alternative assemblies according to the present invention.

Referring to FIGURE 2, like parts have been numbered as in FIGURE 1. The assembly includes additional moulded sand spacer rings 5 and 6 which separate the sleeve 1 from end rings 7 and 8 of exothermic material. The exothermic composition used for the sleeve 1 and the rings 7 and 8 may be the same grade of material but it is preferred, usually, that the sleeve 1 should be of a composition of high heat output while the rings 7 and 8 should be of a composition of low heat output.

Figure 3:
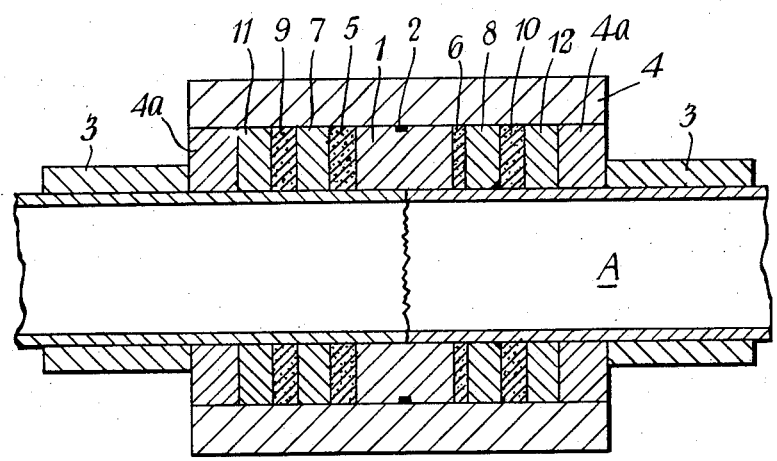

In FIGURE 3 like parts have been similarly numbered. In this case, however, further sand spacer rings 9 and 10 and exothermic sleeves 11 and 12 are included in the assembly as shown. Furthermore, it will be noted that, in the assembly of FIGURE 3, the sand spacer ring 6 is only half the width of sand spacer ring 5.

The following examples, which refer to the accompanying drawings, will serve to illustrate the invention. In these examples, the following exothermic compositions are used:

*Composition A*

| | Percent |
|---|---|
| Aluminium powder | 13 |
| Manganese dioxide | 20 |
| Sodium or potassium nitrate | 8 |
| Cryolite | 2 |
| Ball clay | 4 |
| Dextrin | 2 |
| Refractory filler (sand) | 51 |

*Composition B*

| | |
|---|---|
| Aluminium foil | 8 |
| Manganese dioxide | 15 |
| Potassium chlorate | 6 |
| Cryolite | 3 |
| Ball clay | 6 |
| Dextrin | 4 |
| Refractory filler (grog) | 58 |

*Example 1*

(a) To the weld area in a 4" schedule 80 pipe (i.e. 4½" outside diameter and 0.337" wall thickness) was applied an assembly as illustrated in FIGURE 1. The exothermic sleeve 1, of Composition A, was 8" long, 2½" wall thickness and weighed 26 lbs. 4 ozs. On igniting the exothermic composition, the temperature at the weld area rose to a maximum of 825° C. and the cooling rate through the range 750° to 600° C. was 3.7° C. per minute.

(b) The same pipe was treated using an assembly as shown in FIGURE 2. The same quantity of exothermic Composition A was used as sleeve 1 but this was separated from exothermic end rings 7 and 8 by 1¼" and spacers 5 and 6. The end rings of Composition B were each 2" in length and 2½" wall thickness. On igniting the sleeve 1, the weld area reached a maximum of 825° C. (as in (a) above) but the cooling rate through the range 750° C. to 600° C. was only 2.5° C. per minute.

*Example 2*

(a) The weld area in a schedule 40 pipe of 6⅝" outside diameter was treated as in Example 1 (a) using the assembly shown in FIGURE 1. The sleeve 1 was of Composition A, measuring 4" in length, 2½" wall thickness and weighing 19 lbs. 5 ozs. The maximum temperature attained after ignition was 625° C. The temperature in the weld area was held for 10 minutes in the range 594° C. to 648° C. and the cooling rate down to 500° C. was 3.2° C. per minute.

(b) The assembly illustrated in FIGURE 3 of the accompanying drawings was employed with the following specific data, referring to the various sleeves illustrated:

1—Composition A, length 4", thickness 2½", weight 19 lbs. 5 ozs.

5, 9, and 10—Each sand ring, length 1", thickness 2½", weight 3 lbs. 6 ozs.

6—Sand ring, length ½", thickness 2½", weight 1 lb. 10 ozs.

7, 8, 11, and 12—Each Composition B, length 1¼", thickness 2½", weight 4½ lbs. for each sleeve.

The pipe treated was as in Example 2 (a).

Figure 4:
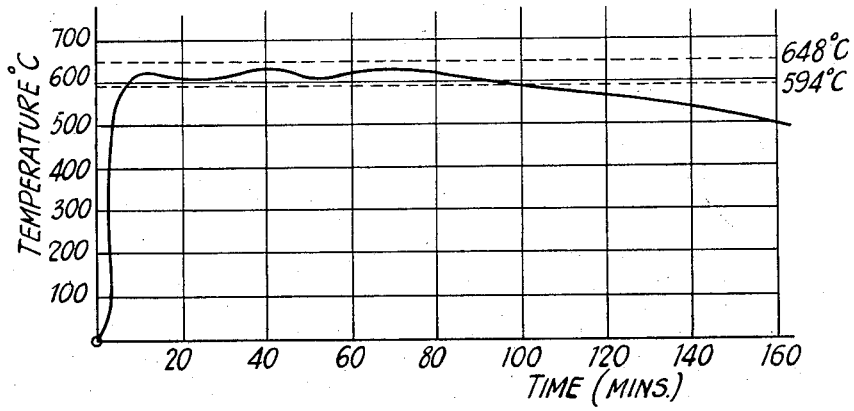
FIGURE 4 is a cooling curve, referred to in Example 2 (b) later herein.

The assembly was ignited by firing the primer 2 in sleeve 1 and thereafter the rings 8, 7, 12 and 11 fired in that order. The temperature achieved at the weld area was 625° C. The temperature/time curve for the weld area is shown in FIGURE 4. It will be noted that the temperature was held within the desired range of 594° C. to 648° C. for about 80 minutes and the subsequent cooling to 500° C. was at a rate of about 1.5° C. per minute.

I claim as my invention:

1. A method of heat-treating a weld joining two lengths of metal pipe which comprises locating, as a first sleeve round the weld area of the pipes, a body of an exothermic composition, locating at the ends of said sleeve sleeves of heat-insulating material which surround the pipe, locating at the outer ends of said heat-insulating sleeves secondary sleeves of an exothermic composition, igniting the first said sleeve and, by conduction of heat from the burning first sleeve igniting the secondary sleeves, and allowing the whole assembly of sleeves to remain in situ until cooled down.

2. A method of heat-treating a weld joining two lengths of metal pipe which comprises locating, as a first sleeve round the weld area of the pipes, a body of an exothermic composition, locating at the ends of said sleeve sleeves of heat-insulating material which surround the pipe, locating at the outer ends of said heat-insulating sleeves secondary sleeves of an exothermic composition, locating at the outer ends of said secondary sleeves further sleeves of heat-insulating composition, locating at the outer ends of said further sleeves tertiary sleeves of an exothermic composition, igniting the first said sleeve and, by conduction of heat from the burning sleeve igniting the secondary sleeves, and by conduction of heat from the secondary sleeves igniting the said tertiary sleeves and allowing the whole assembly of sleeves to remain in situ until cooled down.

3. A method of heat-treating a weld joining two lengths of metal pipe which comprises locating, as a first sleeve round the weld area of the pipes, a body of an exothermic composition, locating at the ends of said sleeve sleeves of heat-insulating material which surround the pipe, locating at the outer ends of said heat-insulating sleeves secondary sleeves of an exothermic composition, housing the whole of the assembly thus produced within sleeves of heat-insulating material, igniting the first said sleeve and, by conduction of heat from the burning first sleeve igniting the secondary sleeves, and allowing the whole assembly of sleeves to remain in situ until cooled down.

4. A method of heat-treating a weld joining two lengths of metal pipe which comprises locating, as a first sleeve round the weld area of the pipes, a body of an exothermic composition, locating at the ends of said sleeve sleeves of heat-insulating material which surround the pipe, locating at the outer ends of said heat-insulating sleeves secondary sleeves of an exothermic composition, igniting the first said sleeve and, by conduction of heat from the burning first sleeve igniting the secondary sleeves at successive points in time, and allowing the whole assembly of sleeves to remain in situ until cooled down.

5. A method of heat-treating a weld joining two lengths of metal pipe which comprises locating, as a first sleeve round the weld area of the pipes, a body of an exothermic composition, locating at the ends of said sleeve sleeves of heat-insulating material which surround the pipe, locating at the outer ends of said heat-insulating sleeves secondary sleeves of exothermic compositions, which have different ignition temperatures igniting the first said sleeve and, by conduction of heat from the burning first sleeve igniting the secondary sleeves, and allowing the whole assembly of sleeves to remain in situ until cooled down.

6. A method of heat-treating a weld poining two lengths of metal pipe which comprises locating, as a first sleeve round the weld area of the pipes, a body of an exothermic composition, locating at the ends of said sleeve sleeves of heat-insulating material which surround the pipe, the said sleeve of heat-insulating material being of different thickness measured in the direction of the pipes, locating at the outer ends of said heat-insulating sleeves secondary sleeves of an exothermic composition, igniting the first said sleeve and, by conduction of heat from the burning first sleeve igniting the secondary sleeves, and allowing the whole assembly of sleeves to remain in situ until cooled down.

7. A method of heat-treating a weld joining two lengths of metal pipe which comprises locating, as a first sleeve round the weld area of the pipes, a body of an exothermic composition, locating at the ends of said sleeve sleeves of heat-insulating material which surround the pipe, the said sleeves of heat-insulating material being of materials of different heat-insulating power locating at the outer ends of said heat-insulating sleeves secondary sleeves of an exothermic composition, igniting the first said sleeve and, by conduction of heat from the burning first sleeve igniting the secondary sleeves, and allowing the whole assembly of sleeves to remain in situ until cooled down.

8. A method of heat-treating a weld joining two lengths of metal pipe which comprises locating, as a first sleeve round the weld area of the pipes, a body of an aluminothermic composition, locating at the ends of said sleeve sleeves of heat-insulating material which surround the pipe, locating at the outer ends of said heat-insulating sleeves secondary sleeves of an aluminothermic composition, igniting the first said sleeve and, by conduction of heat from the burning first sleeve igniting the secondary sleeves, and allowing the whole assembly of sleeves to remain in situ until cooled down.

9. A method of heat-treating a weld joining two lengths of metal pipe which comprises locating, as a first sleeve round the weld area of the pipes, a body of an aluminothermic composition, locating at the ends of said sleeve sleeves of heat-insulating material which surround the pipe, locating at the outer ends of said heat-insulating sleeves secondary sleeves of an aluminothermic composition, igniting the first said sleeve and, by conduction of heat from the burning first sleeve igniting the secondary sleeves at successive points in time, and allowing the whole assembly of sleeves to remain in situ until cooled down.

10. A method of heat-treating a weld joining two lengths of metal pipe which comprises locating, as a first sleeve round the weld area of the pipes, a body of an aluminothermic composition, locating at the ends of said sleeve sleeves of heat-insulating material which surround the pipe, said sleeves of heat-insulating material being of different thickness measured along the pipes locating at the outer ends of said heat-insulating sleeves secondary sleeves of an aluminothermic composition, igniting the first said sleeve and, by conduction of heat from the burning first sleeve igniting the secondary sleeves, and allowing the whole assembly of sleeves to remain in situ until cooled down.

References Cited by the Examiner
UNITED STATES PATENTS

| | | | |
|---|---|---|---|
| 2,133,926 | 10/38 | Ransom et al. | 148—127 |
| 2,500,097 | 3/50 | Soffel | 22—147 |
| 2,951,272 | 9/60 | Kiesler | 22—212 |

OTHER REFERENCES

"Post Heat Treating Weldments With an Exothermic Material" by M. F. Sheely and B. L. Lacey, The Welding Journal, December, 1958, pages 554–57.

DAVID L. RECK, *Primary Examiner*.